United States Patent
Parisotto

(10) Patent No.: US 6,665,960 B2
(45) Date of Patent: Dec. 23, 2003

(54) SKI BOOT

(75) Inventor: Davide Parisotto, Casella D'Asolo (IT)

(73) Assignee: Calzaturificio S.C.A.R.P.A., Viale Tiziano (IT)

( * ) Notice: Subject to any disclaimer, the term of this patent is extended or adjusted under 35 U.S.C. 154(b) by 15 days.

(21) Appl. No.: 10/040,550

(22) Filed: Jan. 7, 2002

(65) Prior Publication Data
US 2002/0108272 A1 Aug. 15, 2002

(30) Foreign Application Priority Data
Jan. 8, 2001 (EP) ................................. 0180006

(51) Int. Cl.[7] ................................. A43B 5/04
(52) U.S. Cl. ................................. 36/117.2; 36/117.3
(58) Field of Search ................................. 36/117.1, 117.2, 36/117.3, 118.2, 117.6

(56) References Cited

U.S. PATENT DOCUMENTS

| | | | | |
|---|---|---|---|---|
| 6,021,589 A | * | 2/2000 | Cagliari et al. | 36/117.1 |
| 6,105,280 A | * | 8/2000 | Marcolin | 36/117.3 |
| 6,139,030 A | * | 10/2000 | Meibock et al. | 36/115 |

FOREIGN PATENT DOCUMENTS

| EP | 0543205 A | 5/1993 |
|---|---|---|
| EP | 0931468 A | 7/1999 |
| EP | 1023849 | 8/2000 |

* cited by examiner

Primary Examiner—Ted Kavanaugh
(74) Attorney, Agent, or Firm—Kenneth L. Sherman, Esq.; Myers Dawes Andras & Sherman; Vic Lin, Esq.

(57) ABSTRACT

A ski boot, in particular a telemark boot, having a shell made of plastic material and in turn having a bottom wall, two lateral walls, a toe portion, and a flexible portion extending crosswise with respect to the shell, from one side to the other of the bottom wall at the metatarsus; and a frame embedded in the shell and having, integrally, two longitudinal elements extending along respective lateral walls from a rear portion of the shell to an intermediate portion of the bottom wall adjacent to respective lateral ends of the flexible portion, and a transverse structure connected integrally to respective front ends of the longitudinal elements and defined by a flat bottom portion embedded in the bottom wall, and by a top portion extending along the connecting portion between the toe portion and the flexible portion.

8 Claims, 2 Drawing Sheets

SKI BOOT

The present invention relates to a ski boot, in particular for telemark skiing.

BACKGROUND OF THE INVENTION

As is known, telemark skiing calls for boots with a flexible metatarsal region to permit turning with the heel raised off the ski, as opposed to clamped rigidly as in conventional skiing.

Telemark ski boots are traditionally made of leather to achieve the necessary degree of flexibility. In recent years, however, the trend has been towards plastic telemark ski boots, which are technically better, more attractive, stronger and more hardwearing than leather To achieve the required degree of flexibility, the metatarsal region of plastic boots normally has a flexible-wall portion, the flexibility of which derives from it being made either to a particular—normally undulated—shape or of more flexible material than the rest of the shell. The use of plastic materials with different mechanical characteristics for more or less flexible parts of the boot is made possible by co-injection processes.

Increasing the flexibility of one portion, however, may impair the torsional stiffness of the boot and, hence, ski control, performance and safety.

By way of a solution to the problem, EPO-A-1 023 849 proposes a boot shell with stiffening ribs extending along the lateral walls of the shell, between an intermediate portion of the sole, close to the flexible-wall portion, and a rear portion of the shell at the heel.

While improving torsional performance of the shell with respect to known boots, this solution has been found to still permit relatively severe torsional strain of the toe portion with respect to the rear portion of the shell.

Moreover, the flexible portion tends to be slow in a recovering its shape following deformation, and to retain a certain amount of permanent deformation after a given number of flexing cycles.

SUMMARY OF THE INVENTION

It is an object of the present invention to provide a plastic ski boot, in particular a telemark boot, designed to solve the aforementioned problems typically associated with known boots.

According to the present invention, there is provided a ski boot, in particular a telemark boot, having a shell made of plastic material and comprising a bottom wall, two lateral walls, a toe portion, a flexible portion extending crosswise with respect to the shell, close to said toe portion and at the metatarsus, and two longitudinal stiffening elements extending along respective said lateral walls of said shell from a rear portion of the shell, where they are joined, to said bottom wall and close to respective lateral ends of said flexible portion; characterized by comprising a stiffening frame built into said shell and integrally comprising said longitudinal elements, and a transverse structure connected to respective front ends of said longitudinal elements and extending close to said flexible portion so as to deform elastically alongside flexing of said shell.

Preferably, the transverse structure is annular and comprises a bottom portion embedded in the bottom wall, and a top portion extending crosswise with respect to the shell and substantially along a connecting portion between the flexible portion and the toe portion.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
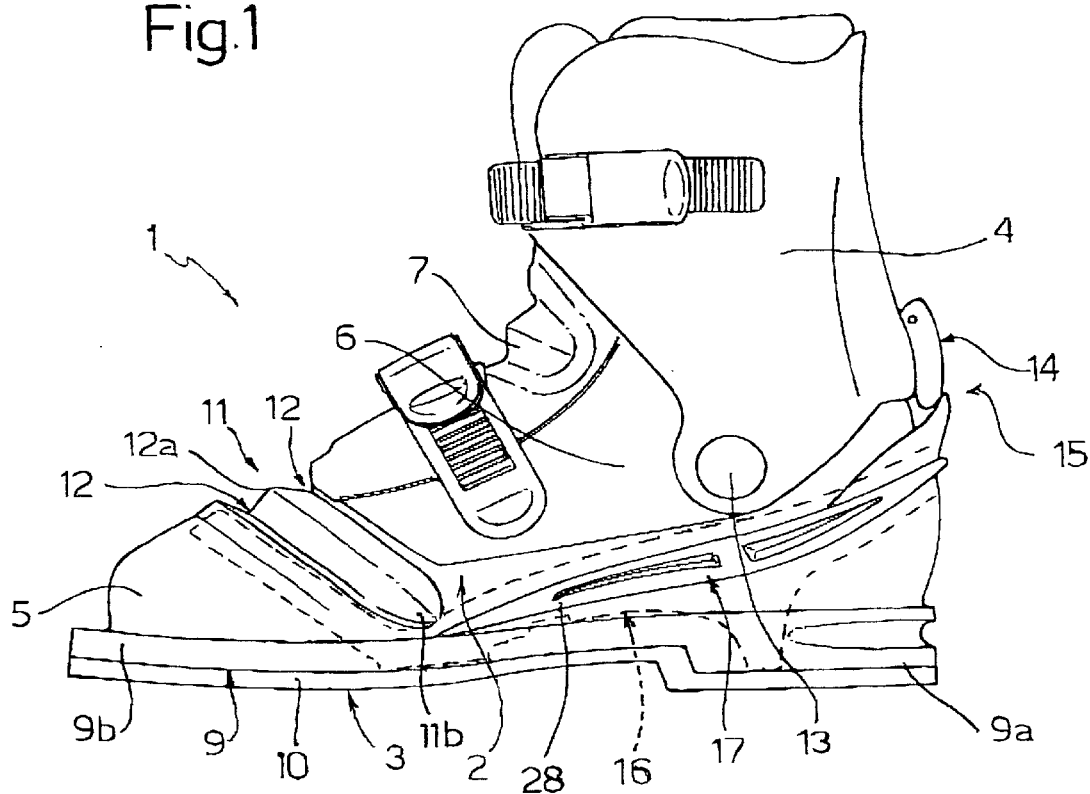
FIG. 1 shows a side view of a telemark boot in accordance with the present invention.

Number 1 in FIG. 1 indicates as a whole a ski boot, in particular a telemark boot.

Boot 1 substantially comprises a shell 2 made of plastic material; a sole 3; and a shank 4 hinged to shell 2 at the ankle.

Shell 2 (FIG. 2) comprises integrally a toe portion 5; two lateral walls 6 forming a front opening 8 closed by a known tongue 7 (FIG. 1); and a bottom wall or inner sole 9 closing the bottom of the shell and forming a heel portion 9a in relief. Inner sole 9 also forms a toe flange 9b projecting from toe portion 5 and cooperating in known manner with a clamp on the ski (not shown) An outer sole 10 made of elastomeric material is fixed to the bottom of inner sole 9 and forms, with inner sole 9, sole 3.

Shell 2 also comprises a flexible portion 11 extending crosswise with respect to the shell, from one side to the other of sole 3, and substantially located at the metatarsus of the wearer, i.e. close to the toe portion 5 of shell 2.

Figure 4:
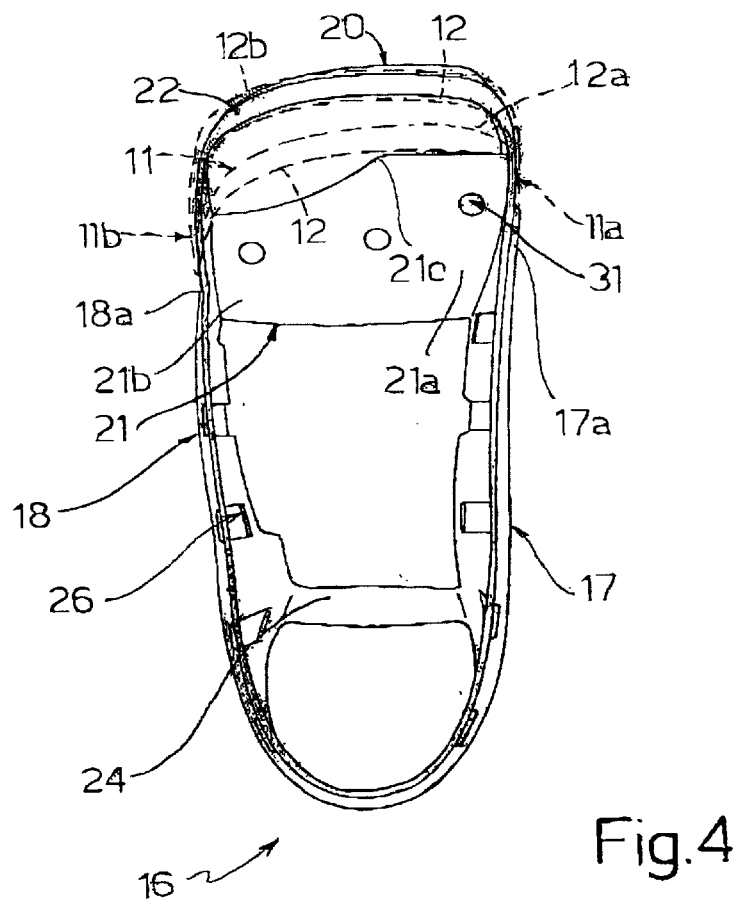
FIG. 4 shows a plan view of the FIG. 3 frame.

Flexible portion 11 has an undulated contour defined by two grooves 12 separated by a radiused intermediate portion 12a, conveniently extends obliquely to follow the natural bend axis of the foot, and has one end 11a, on the inner side of boot 1, located forwards with respect to an end 11b on the outer side of boot 1 (dash lines in FIG. 4).

Shank 4 is connected to lateral walls 6 of shell 2 by respective hinges 13 along the transverse hinge axis of the ankle; and boot 1 comprises a device 14 for controlling the tilt of shank 4 with respect to shell 2 and located at a rear portion 15 of the boot, substantially above the heel.

Figure 2:
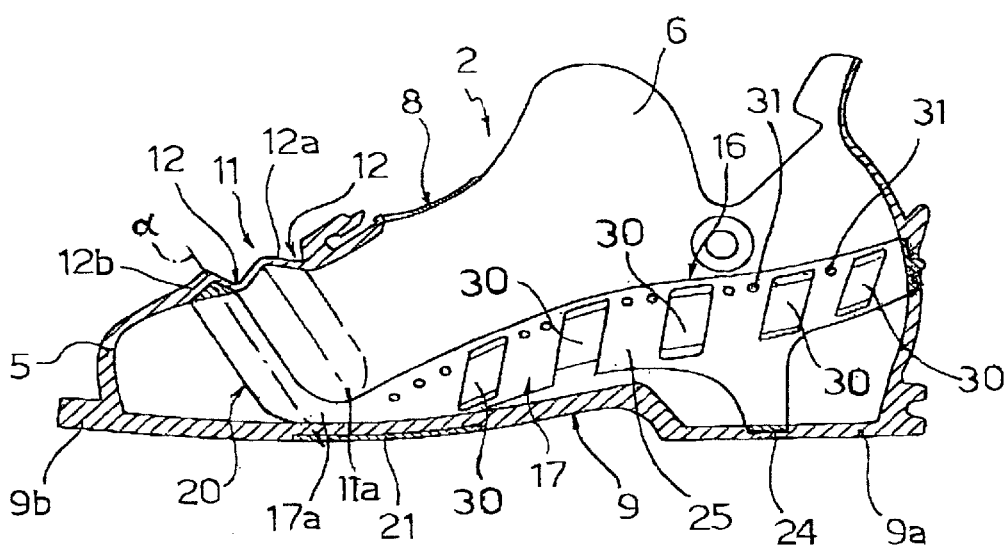
FIG. 2 shows a longitudinal section of the FIG. 1 boot shell.
Figure 3:
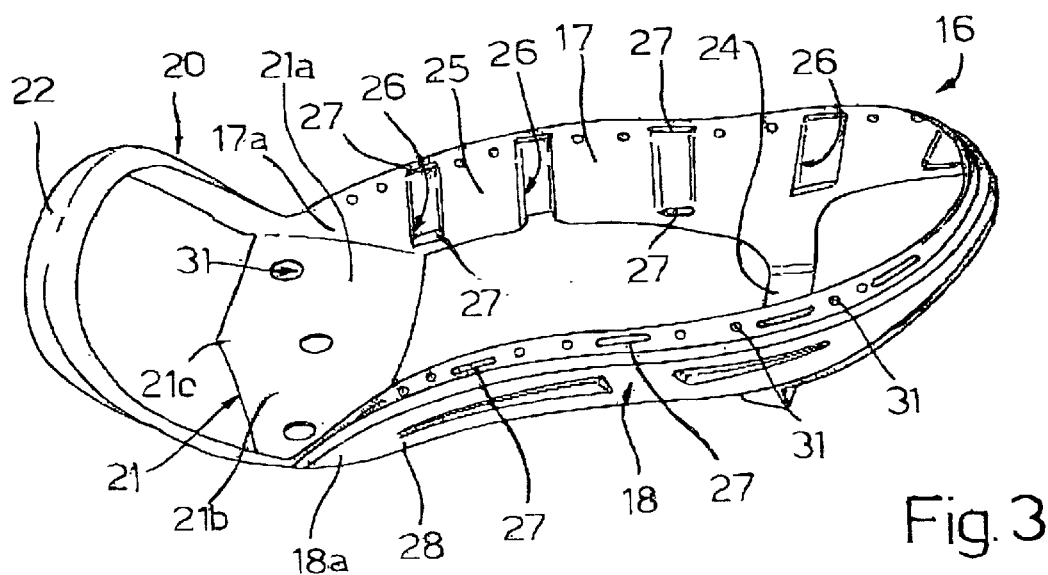
FIG. 3 shows a view in perspective of a stiffening frame of the FIG. 2 shell.

Boot 1 comprises a stiffening frame 16 co-injected into shell 2 (FIG. 2). Frame 16 (FIG. 3) comprises two longitudinal elements 17, 18 embedded in respective lateral walls 6, and which extend from rear portion 15 of the boot, where they are joined, to respective lateral ends 11a, 11b of flexible portion 11, close to inner sole 9, where respective ends 17a, 18a are connected to a transverse stiffening structure 20 forming part of frame 16 and located close to flexible portion 11 so as to extend at least partly beyond flexible portion 11, towards toe portion 5, and so deform elastically alongside flexing of shell 2

Structure 20 is conveniently of closed annular shape, and comprises a flat bottom portion 21 embedded in inner sole 9; and an arc-shaped, substantially triangular-section top portion 22 extending crosswise with respect to shell 2 inside a rib 12b, which is parallel to grooves 12 and forms the connecting portion between flexible portion 11 and toe portion 5 of shell 2 and substantially along a plane roughly perpendicular to elements 17, 18.

Bottom portion 21 extends rearwards from the ends of portion 22 (FIG. 3), is of constant width (measured lengthwise of shell 2) along a lateral portion 21a adjacent to the inner side of the boot, and decreases gradually in width along a lateral portion 21b adjacent to the outer side, so as to form a substantially V-shaped intermediate central appendix 21c extending frontwards with respect to a bend portion of inner sole 9 located between ends 11a, 11b of flexible portion 11.

Frame 16 also comprises a further transverse element 24 located in heel portion 9a of the inner sole and integrally connecting longitudinal elements 17, 18. The two longitudinal elements 17, and 18 are bar-shaped and have respective rear ends joined together at the rear portion 15 of the shell 2, and at a distance from the bottom wall 9 of the boot. Bar-shaped elements 17 and 18 provide a design that is substantially "open," or in other words, the frame 16 contains less material than other designs.

Frame 16 is conveniently injection molded from plastic material chemically similar to but mechanically stiffer than that shell 2. When the material of shell 2 is injected onto frame 16 placed beforehand inside the mold, the surface of the frame 16 material softens to promote adhesion of the materials.

The inner surfaces 25 of elements 17, 18 are conveniently flush with the inner surface of shell 2, and have transverse recesses 26; and elements 17, 18 have through openings 27 located at the ends fo recesses 26 so that, when shell 2 is injected, the material of shell 2 "fills" recesses 26 through openings 27 to form "looplike" portions 30 surrounding corresponding portions of elements 17, 18 to secure frame 16 mechanically to shell 2. The term "looplike", herein, describes the recesses 26 and openings 27 as forming portions 30 that resemble belt-loops of a garment. Looplike portions 30 are designed to receive elements 17, 18 that resemble a belt. Preferably, elements 17, 18 have respective raised outer longitudinal ribs 28 which project from shell 2 (FIG. 1) and provide for both accurately positioning frame 16 inside the injection mold and forming an ornamental motif, particularly when shell 2 and frame 16 are made from different coloured materials. Elements 17, 18 and portion 21 of frame 16 also have holes 31 for mechanically securing frame 16 to shell 2.

In actual use, transverse structure 20, connected integrally to elements 17, 18, provides for drastically reducing the torsional strain of shell 2, and in particular toe portion 5, with respect to the rest of the shell. And since a telemark boot is only connected to the ski by the toe, reducing the torsional strain of the toe affords enormous advantages in terms of ski control.

By virtue of structure 20, and in particular portion 21, the appendix 21c of which substantially participates in flexing shell 22 by substantially acting as a leaf spring, toe portion 5 is more resilient and the tendency of shell 2 to retain a certain amount of permanent deformation is reduced. The shape of portion 21 provides for obtaining the desired springback effect without excessively increasing the flexural stiffness of shell 2.

By virtue of frame 16, shell 2 may be made fairly thin, thus reducing the overall weight of boot 1.

Finally, the slant of flexible portion 11 greatly enhances the effectiveness and comfort of the boot when flexing, by favouring the natural movement of the foot.

Clearly, changes may be made to boot 1 as described herein without, however, departing from the scope of the accompanying claims.

What is claimed is:

1. A ski boot, having a shell (2) made of plastic material and comprising:
    a bottom wall (9);
    two lateral walls (6);
    a toe portion (5);
    a flexible portion (11) extending crosswise with respect to the shell (2), and located at a metatarsus close to said toe portion (5);
    a stiffening frame (16) built into said shell (2) and integrally comprising two longitudinal bar-shaped stiffening elements (17, 18) extending along respective said lateral walls (6) of said shell (2) and having respective rear ends joined together at a rear portion (15) of the shell (2), and at a distance from said bottom wall (9), and respective front ends joined to said bottom wall (9) and close to respective lateral ends (11a, 11b) of said flexible portion (11); said stiffening frame (16) further including a transverse structure (20) connected to said front ends (17a, 18a) of said longitudinal elements (17, 18), said transverse structure (20) comprising a bottom portion (21) embedded in said bottom wall (9) and extending close to said flexible portion (11) so as to deform elastically alongside flexing of said shell (2); and
    a bridge-shaped top portion (22) extending crosswise with respect to said shell (2) and substantially along a connecting portion (12b) between said flexible portion (11) and said toe portion (5).

2. A boot as claimed in claim 1, characterized in that said top portion (22) is housed in a rib (12b) of said shell (2) defining said connecting portion between said toe portion (5) and said flexible portion (11).

3. A boot as claimed in claim 1, characterized in that said flexible portion (11) has an undulated contour and extends obliquely between a more forward end (11a) on the inner side of said shell (2) and a more rearward end (11b) on the outer side of said shell (2).

4. A boot as claimed in claim 3, characterized in that said bottom portion (21) of said transverse structure (20) is flat and has a flexible front portion (21c) extending frontwards with respect to a bend portion of said bottom wall (9) located between the ends (11a, 11b) of said flexible portion (11).

5. A boot as claimed in claim 1, further comprising means for securing said frame (16) mechanically to said shell (2).

6. A boot as claimed in claim 5, characterized in that said means for securing comprise a number of looplike elements (30) forming part of said shell(2) and surrounding portions (17, 18) of said frame (16).

7. A boot as claimed in claim 6, characterized in that said longitudinal elements (17, 18) have respective inner surfaces (25) flush with an inner surface of said shell (2); and respective outer ribs (28) projecting on the outer sides of said lateral wails (6) of said shell (2).

8. A boot as claimed in claim 1, characterized in that said frame (16) comprises a transverse stiffening element (24) integrally connecting said longitudinal elements (17, 18) and embedded in a heel portion (9a) of said bottom wall (9).

* * * * *

UNITED STATES PATENT AND TRADEMARK OFFICE
CERTIFICATE OF CORRECTION

PATENT NO. : 6,665,960 B2
DATED : December 23, 2003
INVENTOR(S) : Davide Parisotto It is certified that error appears in the above-identified patent and that said Letters Patent is hereby corrected as shown below:

Title page,
Item [73], Assignee, "Calzaturificio S.C.A.R.P.A.; Viale Tiziano (IT)" should read
-- Calzaturificio S.C.A.R.P.A. S.p.A.; Asolo (IT) --
Item [30], Foreign Application Priority Data,
"January 8, 2001        (EP)................................................0180006" should
read -- January 8, 2001   (EP)................................................01830006 --

Signed and Sealed this

Twenty-eighth Day of December, 2004

JON W. DUDAS
*Director of the United States Patent and Trademark Office*